(12) United States Patent
Hahm et al.

(10) Patent No.: US 8,369,384 B2
(45) Date of Patent: Feb. 5, 2013

(54) METHOD AND SYSTEM FOR PROCESSING SIGNALS UTILIZING A PROGRAMMABLE INTERFERENCE SUPPRESSION MODULE

(75) Inventors: Mark Hahm, Hartland, WI (US); Wei Luo, Marlboro, NJ (US); Jun Wu, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 674 days.

(21) Appl. No.: 12/612,272

(22) Filed: Nov. 4, 2009

(65) Prior Publication Data
US 2011/0064122 A1    Mar. 17, 2011

Related U.S. Application Data

(60) Provisional application No. 61/242,554, filed on Sep. 15, 2009.

(51) Int. Cl.
*H04B 1/00* (2006.01)
(52) U.S. Cl. ......... 375/148; 375/144; 375/346; 375/349
(58) Field of Classification Search .................. 375/144, 375/148, 229–236, 346–350
See application file for complete search history.

(56) References Cited

U.S. PATENT DOCUMENTS

2003/0095590 A1* 5/2003 Fuller et al. .................. 375/148
2009/0103497 A1* 4/2009 Fernandez-Corbaton et al. ............................ 370/335

* cited by examiner

*Primary Examiner* — Curtis Odom
(74) *Attorney, Agent, or Firm* — Sterne, Kessler, Goldstein & Fox P.L.L.C.

(57) ABSTRACT

Aspects of a method and system for processing signals utilizing a programmable interference suppression module are provided. In this regard, a received signal may be iteratively processed to generate an interference suppressed representation of the received signal. The iterative processing may comprise a weighting iteration; an addback weighting and un-addback iteration, and an addback iteration. The weighting iteration may comprise generating one or more first estimate signals that estimate user signals present in the received signal. The addback, weighting, and un-addback iteration may comprise generating one or more incremental estimate signals based on the one or more first estimate signals and the one or more second estimate signals. The addback iteration may comprise generating an interference suppressed representation of the received signal based on at least the one or more second estimate signals.

14 Claims, 7 Drawing Sheets

METHOD AND SYSTEM FOR PROCESSING SIGNALS UTILIZING A PROGRAMMABLE INTERFERENCE SUPPRESSION MODULE

CROSS-REFERENCE TO RELATED APPLICATIONS/INCORPORATION BY REFERENCE

This patent application makes reference to, claims priority to and claims benefit from U.S. Provisional Patent Application Ser. No. 61/242,554 filed on Sep. 15, 2009.

This application also makes reference to:
U.S. patent application Ser. No. 12/582,771 filed on Oct. 21, 2009;
U.S. patent application Ser. No. 12/604,978 filed on Oct. 23, 2009;
U.S. Patent Application Ser. No. 61/242,524 filed on Sep. 15, 2009;
U.S. patent application Ser. No. 12/573,803 filed on Oct. 5, 2009;
U.S. patent application Ser. No. 12/604,976 filed on Oct. 23, 2009;
U.S. patent application Ser. No. 12/611,810 filed on Nov. 3, 2009;
U.S. Patent Application Ser. No. 61/246,797 filed on Sep. 29, 2009;
U.S. patent application Ser. No. 12/575,879 filed on Oct. 8, 2009;
U.S. patent application Ser. No. 12/575,840 filed on Oct. 8, 2009;
U.S. patent application Ser. No. 12/605,000 filed on Oct. 23, 2009;
U.S. patent application Ser. No. 12/543,283 filed on Aug. 18, 2009;
U.S. patent application Ser. No. 12/570,736 filed on Sep. 30, 2009;
U.S. patent application Ser. No. 12/577,080 filed on Oct. 9, 2009; and
U.S. patent application Ser. No. 12/603,304 filed on Oct. 21, 2009.

Each of the above referenced applications is hereby incorporated herein by reference in its entirety.

FIELD OF THE INVENTION

Certain embodiments of the invention relate to signal processing. More specifically, certain embodiments of the invention relate to a method and system for processing signals utilizing a programmable interference suppression module.

BACKGROUND OF THE INVENTION

Wideband code division multiple access (WCDMA) is a third generation (3G) cellular technology that enables the concurrent transmission of a plurality of distinct digital signals via a common RF channel. WCDMA supports a range of communications services that include voice, high speed data and video communications. One such high speed data communications service, which is based on WCDMA technology, is the high speed downlink packet access (HSDPA) service.

WCDMA is a spread spectrum technology in which each digital signal is coded or "spread" across the RF channel bandwidth using a spreading code. Each of the bits in the coded digital signal is referred to as a "chip". A given base transceiver station (BTS), which concurrently transmits a plurality of distinct digital signals, may encode each of a plurality of distinct digital signals by utilizing a different spreading code for each distinct digital signal. At a typical BTS, each of these spreading codes is referred to as a Walsh code. The Walsh coded digital signal may in turn be scrambled by utilizing a pseudo-noise (PN) bit sequence to generate chips. An example of a PN bit sequence is a Gold code. Each of a plurality of BTS within an RF coverage area may utilize a distinct PN bit sequence. Consequently, Walsh codes may be utilized to distinguish distinct digital signals concurrently transmitted from a given BTS via a common RF channel while PN bit sequences may be utilized to distinguish digital signals transmitted by distinct BTSs. The utilization of Walsh codes and PN sequences may increase RF frequency spectrum utilization by allowing a larger number of wireless communications to occur concurrently within a given RF frequency spectrum. Accordingly, a greater number of users may utilize mobile communication devices, such as mobile telephones, Smart phones and/or wireless computing devices, to communicate concurrently via wireless communication networks.

A user utilizing a mobile communication device, MU_1, may be engaged in a communication session with a user utilizing a mobile communication device MU_2 via a base transceiver station, BTS_A within wireless communication network. For example, the mobile communication device MU_1 may transmit a digital signal to the BTS_A, which the base transceiver station BTS_A may then transmit to the mobile communication device MU_2. The base transceiver station BTS_A may encode signals received from the mobile communication device MU_2 and transmitted to the mobile communication device MU_2 by utilizing a Walsh code, W_12, and a PN sequence, PN_A. The mobile communication device MU_2 may receive signals transmitted concurrently by a plurality of base transceiver stations (BTSs) in addition to the base transceiver station BTS_A within a given RF coverage area. The mobile communication device MU_2 may process the received signals by utilizing a descrambling code that is based on the PN sequence PN_A and a despreading code that is based on the Walsh code W_12. In doing so, the mobile communication device MU_2 may detect a highest relative signal energy level for signals received from base transceiver station BTS_A, which comprise a digital signal corresponding to mobile communication device MU_1.

However, the mobile communication device MU_2 may also detect signal energy from the digital signals, which correspond to signals from mobile communication devices other than the mobile communication device MU_1. The other signal energy levels from each of these other mobile communication devices may be approximated by Gaussian white noise, but the aggregate noise signal energy level among the other mobile communication device may increase in proportion to the number of other mobile communication devices whose signals are received at the mobile communication device MU_2. This aggregate noise signal energy level may be referred to as multiple access interference (MAI). The MAI may result from signals transmitted by the base transceiver station BTS_A, which originate from signal received at the base transceiver station BTS_A from mobile communication devices other than mobile communication device MU_1. The MAI may also result from signals transmitted by the base transceiver stations BTSs other than the base transceiver station BTS_A. The MAI and other sources of noise signal energy may interfere with the ability of MU_2 to successfully decode signals received from MU_1.

An additional source of noise signal energy may result from multipath interference. The digital signal energy corresponding to the mobile communication device MU_2, which is transmitted by the base transceiver station BTS_A may disperse in a wavefront referred to as a multipath. Each of the components of the multipath may be referred to as a multipath signal. Each of the multipath signals may experience a different signal propagation path from the base transceiver station BTS_A to the mobile communication device MU_2. Accordingly, different multipath signals may arrive at different time instants at the mobile communication device MU_2. The time duration, which begins at the time instant that the first multipath signal arrives at the mobile communication device MU_2 and ends at the time instant that the last multipath signal arrives at the mobile communication device MU_2 is referred to as a delay spread. The mobile communication device MU_2 may utilize a rake receiver that allows the mobile communication device MU_2 to receive signal energy from a plurality of multipath signals received within a receive window time duration. The receive window time duration may comprise at least a portion of the delay spread time duration. Multipath signals, which are not received within the receive window time duration may also contribute to noise signal energy.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for processing signals utilizing a programmable interference suppression module, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
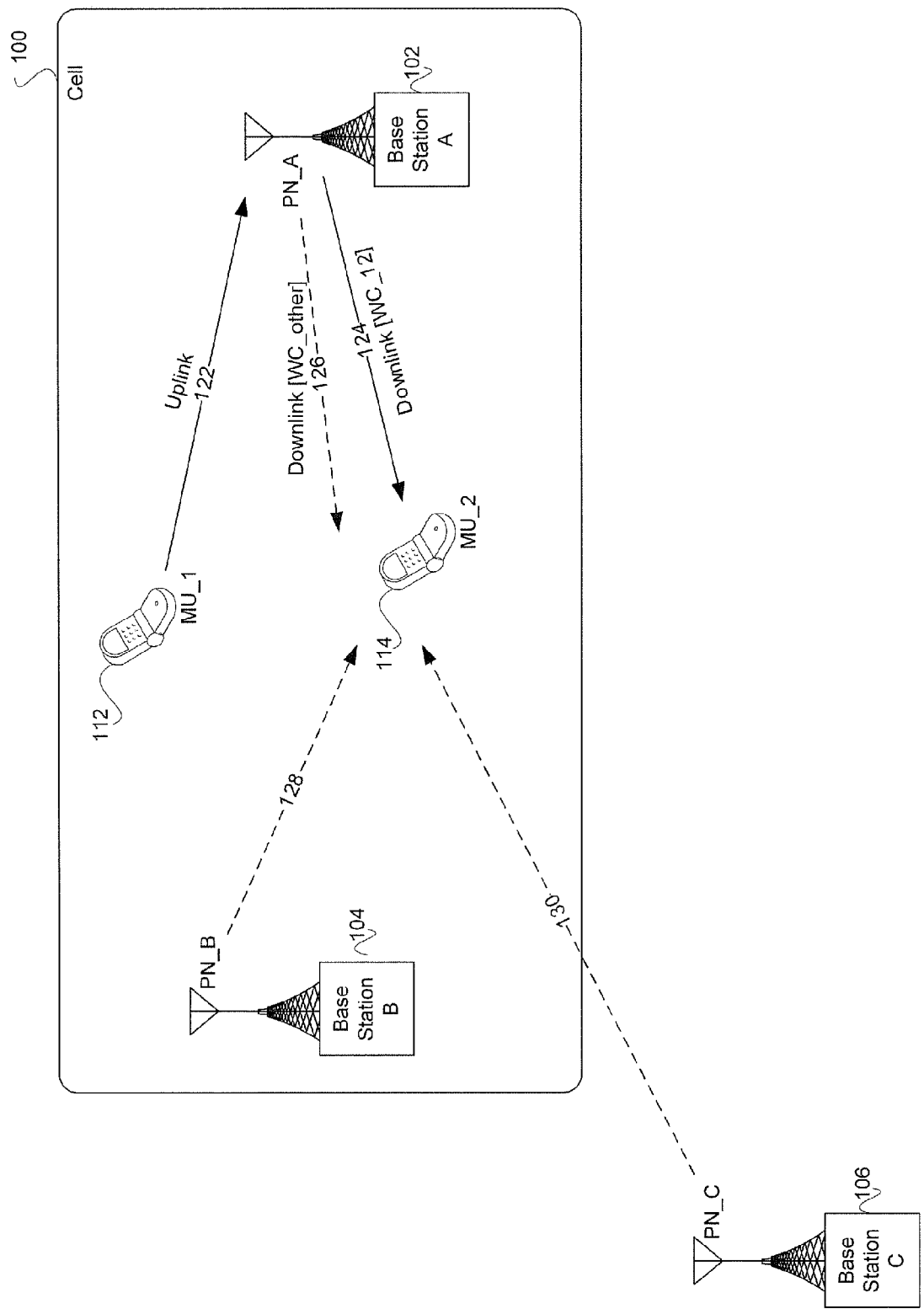
FIG. 1 is a diagram illustrating an exemplary wireless communication system, which is operable to provide interference suppression in WCDMA, in accordance with an embodiment.

Certain embodiments of the invention may be found in a method and system for processing signals utilizing a programmable interference suppression module. In various embodiments of the invention, a received signal may be iteratively processed to generate an interference suppressed representation of the received signal. The iterative processing may comprise a weighting iteration, one or more addback weighting and un-addback iterations, and an addback iteration.

The weighting iteration may comprise generating one or more first estimate signals that estimate user signals present in the received signal, and generating a first residual signal based on information contained in the received signal and the one or more first estimated signals. The one or more first estimate signals may be generated by descrambling and despreading the received signal to generate a plurality of user signals having unsuppressed interference, and scaling, respectively, the user signals having unsuppressed interference by a corresponding one or more scaling factors. The first residual signal may be generated by spreading and scrambling the one or more first estimate signals to generate a first chip-level estimate signal, and subtracting the first chip-level estimate signal from the received signal to generate the first residual signal.

The one or more addback, weighting, and un-addback iterations may comprise generating one or more first intermediate signals based on information contained in the first estimate signals and the residual signal, generating one or more second estimate signals that estimate user signals present in the one or more first intermediate signals, generating one or more incremental estimate signals based on the one or more first estimate signals and the one or more second estimate signals, and generating a second residual signal based on information contained in the one or more incremental estimate signals and the first residual signal. The one or more first intermediate signals may be generated by descrambling and despreading the first residual signal to generate one or more first residual user signals, and adding, respectively, the one or more first residual user signals to the one or more first estimate signals. The one or more second estimate signals may be generated by scaling the one or more intermediate signals, respectively, by a corresponding one or more scaling factors. The one or more incremental estimate signals may be generated by subtracting, respectively, the one or more first estimate signals from the one or more second estimate signals. The second residual signal may be generated by spreading and scrambling the one or more incremental estimate signals to generate an incremental chip-level estimate signal, and subtracting the incremental chip-level estimate signal from the first residual signal.

The addback iteration may comprise generating an interference suppressed representation of the received signal based on at least the one or more second estimate signals and the second residual signal. The interference suppressed representation of the received signal may be generated by descrambling and despreading the second residual signal to generate one or more second residual user signals, and adding, respectively, the one or more second residual user signals to the one or more second estimate signals.

FIG. 1 is an illustration of an exemplary wireless communication system, in accordance with an embodiment. Referring to FIG. 1, there is shown a cell 100 and a base station C 106. The cell 100 comprises base station A 102, base station B 104, mobile communication device MU_1 112 and mobile communication device MU_2 114. The base station 106 may be located outside of the cell 100.

The mobile communication devices MU_1 112 and MU_2 114 may be engaged in a communication via the base station A 102. The mobile communication device MU_1 112 may transmit signals to the base station A 102 via an uplink RF channel 122. In response, the base station A 102 may transmit signals to the mobile communication device MU_2 114 via a downlink RF channel 124. Signals transmitted by the base station A 102 may communicate chips that are generated utilizing a scrambling code PN_A. The signals transmitted via RF channel 124 may be spread utilizing a spreading code WC_12. The spreading code WC_12 may comprise an orthogonal variable spreading factor (OVSF) code, for example a Walsh code, which enables the mobile communication device MU_2 114 to distinguish signals transmitted by the base station A 102 via the downlink RF channel 124 from signals transmitted concurrently by the base station A 102 via other downlink RF channels, for example downlink RF channel 126. The base station A 102 may utilize one or more OVSF codes, WC_other, when spreading data transmitted via downlink RF channel 126. The one or more OVSF codes, WC_other, may be distinct from the OVSF code WC_12.

The mobile communication device MU_2 114 may receive MAI signals from RF channel 126, RF channel 128 and/or RF channel 130. As stated above, the signals received via RF channel 126 may be transmitted by the base station A 102. The signals received via RF channel 128 may be transmitted by the base station B 104. The signals transmitted by the base station 104 may be scrambled based on a scrambling code PN_B. The signals received via RF channel 130 may be transmitted by the base station C 106. The signals transmitted by the base station C 106 may be scrambled based on a scrambling code PN_C.

The mobile communication device MU_2 114 may be operable to perform a soft handoff from the current serving base station A 102 to any of a plurality of base stations located within the cell 100, for example, the base station B 104. Accordingly, the mobile communication device MU_2 114 may be operable to process received signals based on scrambling code PN_A and/or scrambling code PN_B. In this regard, the mobile communication device MU_2 114 may listen for signals from both base station A 102 and base station B 104. The mobile communication device MU_2 114 may not be operable to perform a soft handoff from the current serving base station A 102 to a base station, which is outside of the cell 100, for example, the base station C 106. Accordingly, the mobile communication device MU_2 114 may not be operable to process received signals based on scrambling code PN_C. In this regard, MU_2 114 may not listen for signals from base station C 106.

While the desired signal at the mobile communication device MU_2 114 may be received via RF channel 124, the mobile communication device MU_2 114 may also receive signal energy via the RF channel 126, the RF channel 128 and/or the RF channel 130. The received signal energies from the RF channels 126, 128 and/or 130 may result in MAI, which may interfere with the ability of the mobile communication device MU_2 114 to receive desired signals via RF channel 124.

In various embodiments of the invention, the mobile communication device MU_2 may comprise suitable logic, circuitry and/or code that are operable to receive signal energy via the RF channels 124, 126, 128 and/or 130, and suppress interference signal energy received via the RF channels 126, 128 and/or 130. The mobile communication device MU_2 may utilize an iterative method for interference cancellation. The iterative method may comprise a weighting iteration, one or more addback, weighting, and un-addback iterations, and an addback iteration.

Although FIG. 1 depicts communication between two mobile devices via a single BTS, the invention is not so limited. For example, aspects of the invention may be equally applicable regardless of the origin of data communicated wirelessly to the mobile communication device 114.

Figure 2:
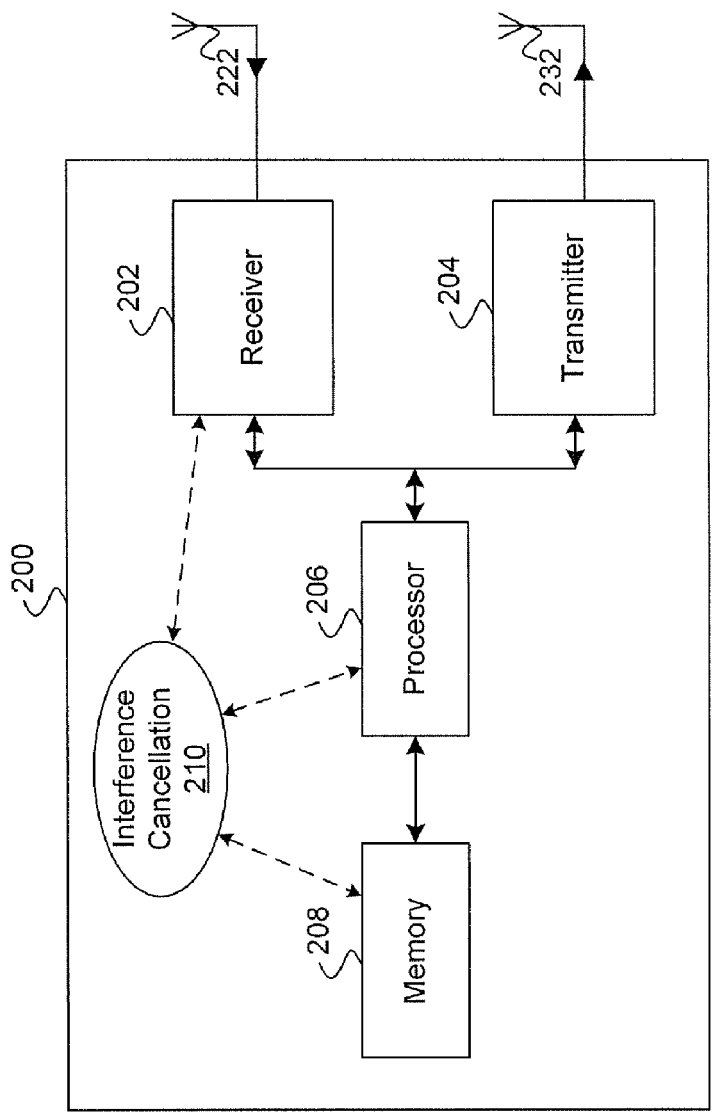
FIG. 2 is a diagram of an exemplary communication device, which is operable to provide interference suppression for WCDMA, in accordance with an embodiment of the invention.

FIG. 2 is a diagram of an exemplary communication device, which may utilize interference suppression for WCDMA, in accordance with an embodiment of the invention. Referring to FIG. 2, there is shown a transceiver system 200, a receiving antenna 222 and a transmitting antenna 232. The transceiver system 200 may comprise at least a receiver 202, a transmitter 204, a processor 206, an interference cancellation module 210 and a memory 208. Although a separate receiver 202 and transmitter 204 are illustrated by FIG. 2, the invention is not limited. In this regard, the transmit function and receive function may be integrated into a single transceiver block. The transceiver system 200 may also comprise a plurality of transmitting antennas and/or a plurality of receiving antennas, for example to support diversity transmission and/or diversity reception. Various embodiments of the invention may comprise a single antenna, which is coupled to the transmitter 204 and receiver 202 via a transmit and receive (T/R) switch. The T/R switch may selectively couple the single antenna to the receiver 202 or to the transmitter 204 under the control of the processor 206, for example.

The receiver 202 may comprise suitable logic, circuitry, interfaces and/or code that may be operable to perform receive functions that may comprise PHY layer function for the reception or signals. These PHY layer functions may comprise, but are not limited to, the amplification of received RF signals, generation of frequency carrier signals corresponding to selected RF channels, for example uplink or downlink channels, the down-conversion of the amplified RF signals by the generated frequency carrier signals, demodulation of data contained in data symbols based on application of a selected demodulation type, and detection of data contained in the demodulated signals. The RF signals may be received via the receiving antenna 222. The receiver 202 may be operable to process the received RF signals to generate baseband signals. A chip-level baseband signal may comprise a plurality of chips. The chip-level baseband signal may be descrambled based on a PN sequence and despread based on an OVSF code, for example a Walsh code, to generate a symbol-level baseband signal. The symbol-level baseband signal may comprise a plurality of data symbols. The receiver 202 may comprise a rake receiver, which in turn comprises a plurality of rake fingers to process a corresponding plurality of received multipath signals.

The transmitter 204 may comprise suitable logic, circuitry, interfaces and/or code that may be operable to perform transmit functions that may comprise PHY layer function for the transmission or signals. These PHY layer functions may comprise, but are not limited to, modulation of received data to generate data symbols based on application of a selected modulation type, generation of frequency carrier signals corresponding to selected RF channels, for example uplink or downlink channels, the up-conversion of the data symbols by the generated frequency carrier signals, and the generation and amplification of RF signals. The RF signals may be transmitted via the transmitting antenna 232.

The memory 208 may comprise suitable logic, circuitry, interfaces and/or code that may enable storage and/or retrieval of data and/or code. The memory 208 may utilize any of a plurality of storage medium technologies, such as volatile memory, for example random access memory (RAM), and/or non-volatile memory, for example electrically erasable programmable read only memory (EEPROM).

The interference cancellation module 210 may comprise suitable logic, circuitry and/or code that are operable to suppress interference signals, relative to a desired signal, in a received signal. The received signal may comprise one or more desired signals and one or more interference signals. The interference cancellation module 210 may generate an interference suppressed versions of the one or more signals in which the signal level for the interference signals is reduced relative to the signal level for the desired signal.

In operation, the receiver 202 may receive signals via the receiving antenna 222. In an exemplary embodiment of the invention, the receiver 202 may comprise a rake receiver. The receiver 202 may communicate signals to the processor 206 and/or to the interference cancellation module 210.

The receiver 202 may generate timing information that corresponds to each of the fingers in the rake receiver portion of the receiver 202. Each of the fingers in the rake receiver may process a distinct one of a plurality of multipath signals that are received within a delay spread time duration. Based on the received RF signals, the receiver may generate chip-level baseband signals. The receiver 202 may communicate the chip-level baseband signals to the interference cancellation module 210. The rake receiver 202 may generate one or more symbol-level baseband signals based on a selected one or more OVSF codes and a selected one or more PN sequences. The symbol-level baseband signals may be communicated to the processor 206. The OVSF codes may be selected based on a specified desired user signal. For example, referring to FIG. 1, the rake receiver 202 associated with mobile communication device MU_2 may select an OVSF code, WC_12, and a PN sequence, PN_A, which may be utilized to generate the symbol-level baseband signal from the chip-level baseband signal.

The processor 206 may utilize common pilot channel (CPICH) information, communicated by the signals received from the receiver 202, to compute a plurality of channel estimate values or, in various embodiments of the invention, the receiver 202 may compute the channel estimate values. The processor 206 and/or receiver 202 may compute one or more channel estimate values corresponding to each multipath signal, which was transmitted by a given transmit antenna of a given BTS and received at a finger in the rake receiver. The computed channel estimate values may be represented as a channel estimate matrix, $H_{bts,fgr}$, where bts represents a numerical index that is associated with a given BTS and fgr is a numerical index that is associated with a given rake finger. The processor 206 may be operable to communicate the computed channel estimate values to the receiver 202 and to the interference cancellation module 210 and/or to the memory 208. The processor 206 may compute and/or select one or more interference cancellation parameter values, which control the signal interference cancellation performance of the interference cancellation module 210. The processor 206 may also be operable to communicate the interference cancellation parameter values to the interference cancellation module 210 and/or to the memory 208.

The processor 206 may also determine which BTSs are associated with a current cell 100 and which BTSs are not associated with the current cell 100. For example, the processor 206 may determine that the base station A 102 and the base station B 104 are associated with the current cell 100, while the base station C 106 is not associated with the current cell 100. In an exemplary embodiment of the invention, the processor 206 may store PN sequence for at least a portion of the BTSs that are associated with the current cell 100. For example, referring to FIG. 1, the processor 206 may generate and/or store corresponding PN sequences, for example PN_A and PN_B in the memory 208. The PN sequences may be generated on the fly based on the code structure utilized by the BTS and/or based on timing information associated with the BTS. The PN sequences PN_A and PN_B may be associated with the current cell 100.

In other exemplary embodiments of the invention, the processor 206 may generate and/or store PN sequences for at least a portion of the BTSs that are associated with the current cell 100 and at least a portion of the BTSs that are not associated with the current cell 100. For example, referring to FIG. 1, the processor 206 may generate and/or store corresponding PN sequences, for example PN_A, PN_B and PN_C in the memory 208. In general, the processor 206 may store the PN sequences for the BTSs from which a mobile communication device, for example the mobile communication device MC_2 114, may expect to receive signals and the processor 206 may store PN sequences from which the mobile communicating device may not expect to receive signals. The mobile communication device may expect to receive signals, for example common pilot channel (CPICH) signals, from a plurality of BTSs in anticipation of a soft handoff from a current service BTS to a subsequent serving BTS.

In instances in which the transceiver system 200 utilizes a plurality of receiving antennas, for example the receiving antennas 222_1 and 222_2, the transceiver system 200 may utilize receive diversity. In a receive diversity system, the receiver 202 may receive a first set of signals via the receiving antenna 222_1 and a second set of signals via the receiving antenna 222_2. The processor 206 may compute a first set of channel estimate values corresponding to receiving antenna 222_1 and a second set of channel estimate values corresponding to receiving antenna 222_2. The computed channel estimate values may be represented as a channel estimate matrix, $H_{bts,rx,fgr}$, where rx represents a numerical index that is associated with a given receiving antenna. In various embodiments of the invention, which utilize receive diversity, the receiver 202 and/or the interference cancellation module 210 may also process signals that are transmitted by BTSs, which utilize signal transmission diversity.

The interference cancellation module 210 may receive signals from the receiver 202, which correspond to received multipath signals. The signals received by the interference cancellation module 210 may comprise chip-level baseband signals. A plurality of chips, for example 256 chips, may be associated with a data symbol. The interference cancellation module 210 may be operable to determine a time duration that corresponds to a data symbol processing period. The interference cancellation module 210 may be operable to determine whether to perform iterations of a signal interference suppression on received chip-level baseband signals and/or symbol-level baseband signals, in accordance with an embodiment of the invention, during each data symbol processing period. The determination of whether to perform iterations of the signal interference suppression method may be based on, for example, the time instants at which chips, which are associated with a current data symbol and/or subsequent data symbol, arrive at the receiver 202 via received RF signals.

The interference cancellation module 210 may retrieve a plurality of channel estimate values, one or more PN sequences, a plurality of OVSF codes, and one or more interference cancellation parameter values from memory 208. The interference cancellation module 210 may receive timing information from the receiver 202 that corresponds to each of the fingers in the rake receiver portion of the receiver 202.

The interference cancellation module 210 may process received signals, utilizing received timing information and channel estimate values, to combine the multipath signals which are associated with corresponding fingers in the rake receiver. In various embodiments of the invention, the interface cancellation module 210 may combine the multipath signals to generate a combined chip-level signal by utilizing, for example, maximal ratio combining (MRC) and/or equal gain combining (EGC). The interference cancellation module 210 may process the combined chip-level signal, by utilizing PN sequences and OVSF codes, to determine a signal level associated with each of the plurality of OVSF codes for each of one or more selected PN sequences. In an exemplary embodiment of the invention, the plurality of OVSF codes comprises 256 Walsh codes. Each signal associated with an OVSF code may be referred to as a corresponding user signal although it should be noted that multiple OVSF codes may be associated with a single user and thus there is not necessarily a one-to-one correspondence between OVSF codes and users. For example, a signal associated with a $j^{th}$ OVSF code may be referred to as a $j^{th}$ user signal. Referring to FIG. 1, for example, the OVSF code WC_12 may be associated with a user signal that is transmitted from base station A 102 to the mobile telephone MC_2 114.

The interference cancellation module 210 may compute a signal power level value and a noise power level value corresponding to each of the user signals. Based on the computed signal power level value, noise power level value, and the one or more interference cancellation parameter values, the interference cancellation module 210 may compute a weighting factor value corresponding to each user signal. The plurality of weighting factor values associated with each BTS may be represented as a weighting factor matrix, $A_{bts}$, where bts represents a numerical index value that is associated with a given BTS. In an exemplary embodiment of the invention, the weighting factor values for a given BTS may be computed as illustrated by the following equations:

$$z_j \cong \frac{\lambda x_j^2}{\lambda x_j^2 + y_j^2} \quad [1a]$$

when $$x_j^2 > \gamma y_j^2 \quad [1b]$$

and:

$$z_j = 0 \quad [1c]$$

when $$x_j^2 < \gamma y_j^2 \quad [1d]$$

where $z_j$ represents the weighting factor value for the $j^{th}$ user signal and j may be, for example, an integer from 0 to J; $x_j^2$ represents the signal power level value for the $j^{th}$ user signal, which was generated by descrambling a received signal based on a PN sequence for the given BTS and despreading the descrambled signal utilizing the OVSF code associated with the $j^{th}$ user; $y_j^2$ represents the noise power level value for the $j^{th}$ user signal, which was generated by descrambling the received signal based on the PN sequence for the given BTS and despreading the descrambled signal utilizing the OVSF code associated with the $j^{th}$ user; and $\lambda$ and $\gamma$ represent interference cancellation parameter values.

The weighting factor values $z_j$ may correspond to a signal to noise ratio (SNR) measure for the $j^{th}$ user signal. Values for $z_j$ may be within the range $0 \leq z_j^2 \leq 1$. In one regard, values of $z_j$ may be an a priori measure of confidence that a given user signal comprises valid signal energy that was transmitted by the BTS.

The interference cancellation module 210 may be operable to process chip-level signals received from each of a plurality of rake fingers in the receiver 202 to generate corresponding interference suppressed chip-level signals based on an iterative method for interference cancellation, in accordance with an embodiment of the invention. The interference suppressed chip-level signals may be output to each corresponding rake finger. Each of the rake fingers may then process its respective interference suppressed chip-level signals.

The weighting factor value z(j) is a function of the interference cancellation parameter values $\lambda$ and $\gamma$. In various embodiments of the invention, the interference cancellation parameters $\lambda$ and $\gamma$ may comprise integer and/or non-integer values. In an exemplary embodiment of the invention, $\lambda=1$ and $\gamma=1$. The processor 206 may be operable to monitor the interference cancellation performance of the interference cancellation module 210, for example by measuring SNR values for processed signals generated by the receiver 202 based on interference suppressed chip-level signals. Accordingly, the processor 206 may be operable to adjust one or both interference cancellation parameter values $\lambda$ and $\gamma$.

Figure 3:
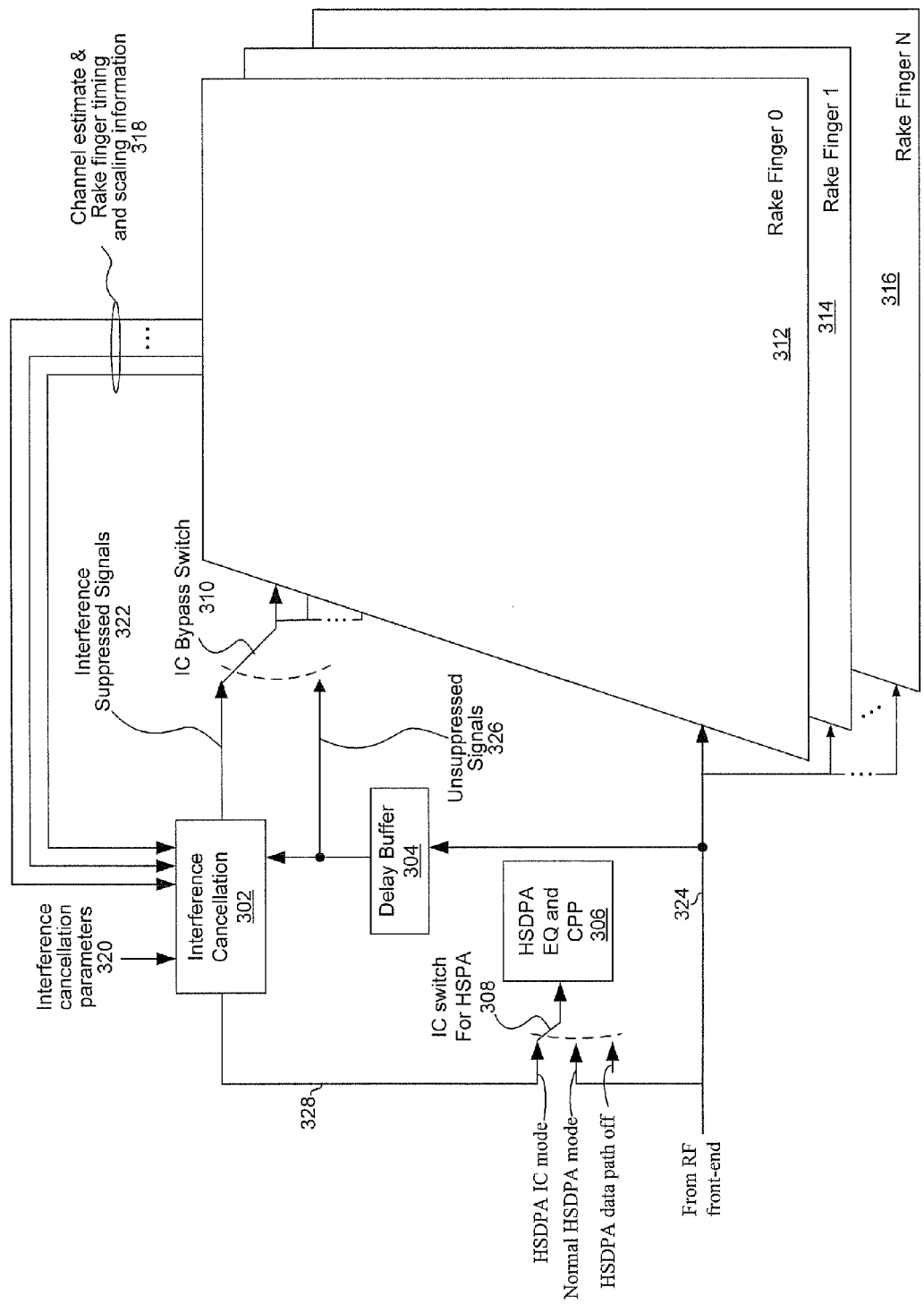
FIG. 3 is a diagram of an exemplary WCDMA receiver with interference suppression, in accordance with an embodiment of the invention.

FIG. 3 is a diagram of an exemplary WCDMA receiver with interference suppression, in accordance with an embodiment of the invention. Referring to FIG. 3, there is shown an interference cancellation module 302, a delay buffer 304, a HSDPA processor 306, an HSDPA switching device 308, interference cancellation (IC) bypass switching device 310, and a plurality of rake fingers 312, 314 and 316. The interference cancellation module 302 may correspond to the interference cancellation module 210 as presented in FIG. 2. The rake fingers 312, 314 and 316 represent fingers in a rake receiver. In an exemplary embodiment of the invention, the HSDPA switching device 308 and the IC bypass switching device 310 may be configured by the processor 206.

The delay buffer 304 may comprise suitable logic, circuitry, interfaces and/or code that may be operable to receive a burst of a chip-level signal 324 as input at a given input time instant and output it as a burst of a chip-level signal 326 at a subsequent output time instant. The time duration between the input time instant and the output time instant may be referred to as a delay time duration. In an exemplary embodiment of the invention, the delay time duration corresponds to 512 chips.

The HSDPA processor 306 may comprise suitable logic, circuitry, interfaces and/or code that may be operable to provide HSDPA processing of received signals.

In operation, the HSDPA switching device 308 may comprise suitable logic, circuitry, interfaces and/or code that are operable to select an input signal to the HSDPA processor 306. As illustrated with respect to FIG. 3, the HSDPA switching device 308 is configured so that it is operable to supply an interference suppressed signal 328, generated by the interference cancellation module 302, as an input to the HSDPA processor 306. As indicated in FIG. 3, this configuration of the HSDPA switching device 308 may result in the HSDPA switching device 308 operating in a HSDPA interference cancellation (IC) mode.

The HSDPA switching device 308 may also be configured so that it is operable to supply the baseband signal 324, generated by the receiver 202, as an input to the HSDPA processor 306. As indicated in FIG. 3, this configuration of the HSDPA switching device 308 may result in the HSDPA switching device 308 operating in a normal HSDPA mode.

The HSDPA switching device 308 may also be configured such that no input signal is supplied to the HSDPA processor 306. As indicated in FIG. 3, this configuration of the HSDPA switching device 308 may result in the HSDPA switching device 308 operating in a HSDPA data path off mode.

The IC bypass switching device 310 may comprise suitable logic, circuitry, interfaces and/or code that are operable to select an input signal to the rake fingers 312, 314 and 316. As illustrated by FIG. 3, the IC bypass switching device 310 is configured so that it is operable to supply an interference suppressed signal 322, generated by the interference cancellation module 302, as an input to the rake fingers 312, 314 and 316.

The IC bypass switching device 310 may also be configured so that it is operable to supply a signal 326, which is output from the delay buffer 304, as an input to the rake fingers 312, 314 and 316. The signal 326 output from the delay buffer 304 may comprise a time-delayed, and possibly up-sampled or down-sampled, version of the signal 324 generated by the receiver 202. As indicated in FIG. 3, the signal 326 output from the delay buffer 304 may comprise unsuppressed interference.

Each of the rake fingers 312, 314 and 316 may receive, as input, the chip-level baseband signal 324 generated by the receiver 202. Based on the input baseband signal 324 from the receiver 202, each rake finger 312, 314 and 316 may generate channel estimates and rake finger timing information. In various embodiments of the invention, each rake finger 312, 314 and 316 may generate the channel estimates and/or rake finger timing information for selected multipath signals based on CPICH data received via the input baseband signal 324 received from the receiver 202. In an exemplary embodiment of the invention, which comprises a receive diversity system, channel estimates and/or rake finger timing information may be generated for RF signals received at the receiver 202 via at least a portion of a plurality of receiving antennas. Each rake finger 312, 314 and 316 may communicate, as one or more signals 318, its respective channel estimates, rake finger timing information, scaling factors $K_{fgr}$, scrambling codes associated with one or more BTSs, and/or other information to the interference cancellation module 302.

In various embodiments of the invention, the interference cancellation module 302 may receive chip-level signals 326 from the delay buffer 304. Based on the channel estimates, rake finger timing, and/or other information communicated via the signal(s) 318, the interference cancellation module 302 may select individual multipath signals from the chip-level signals 326 received via the delay buffer 304. Based on the interference cancellation parameters 320, which may be as described with respect to FIG. 2, the interference cancellation module 302 may process the received chip-level multipath signal 326 utilizing an iterative method for interference cancellation, in accordance with an embodiment of the invention.

The chip-level signals 326 received from the delay buffer 304 may comprise a plurality of multipath signals received via one or more receive antennas from one or more transmit antennas of one or more BTSs. The interference cancellation module 302 may be configurable to assign signal processing resources to perform the iterative method of interference cancellation for selected multipath signals. The processor 206 may configure the interference cancellation module 302 to receive multipath signals from one or more transmit antennas of one or more BTSs. In an exemplary embodiment of the invention, which comprises a receive diversity system, the selected multipath signals may be received via one or more of a plurality of receiving antennas. The processor 206 may configure the interference cancellation module 302 for receive diversity.

The interference cancellation module 302 may receive interference cancellation parameters 320 from the processor 206 and/or from the memory 208. In an exemplary embodiment of the invention, the interference cancellation module 302 may generate and/or retrieve PN sequences and/or OVSF codes from the memory 208. The PN sequences may be generated on the fly based on the code structure utilized by the BTS and/or based on timing information associated with the BTS. The interference cancellation module 302 may retrieve and/or generate a PN sequence for each of the one or more transmit antennas of the one or more BTSs from which the interference cancellation module 302 is configured to attempt to receive a signal.

In various embodiments of the invention in which the receiver 202 utilizes a plurality of receiving antennas and/or receives data from a plurality of transmit antennas, data received via the symbol-level signals corresponding to the plurality of receiving antennas and/or transmit antennas may be decoded by utilizing various diversity decoding methods. Various embodiments of the invention may also be practiced when the receiver 202 is utilized in a multiple input multiple output (MIMO) communication system. In instances where the receiver 202 is utilized in a MIMO communication system, data received via the symbol-level signals, received via the plurality of receiving antennas, may be decoded by utilizing various MIMO decoding and/or diversity decoding methods.

Figure 4:
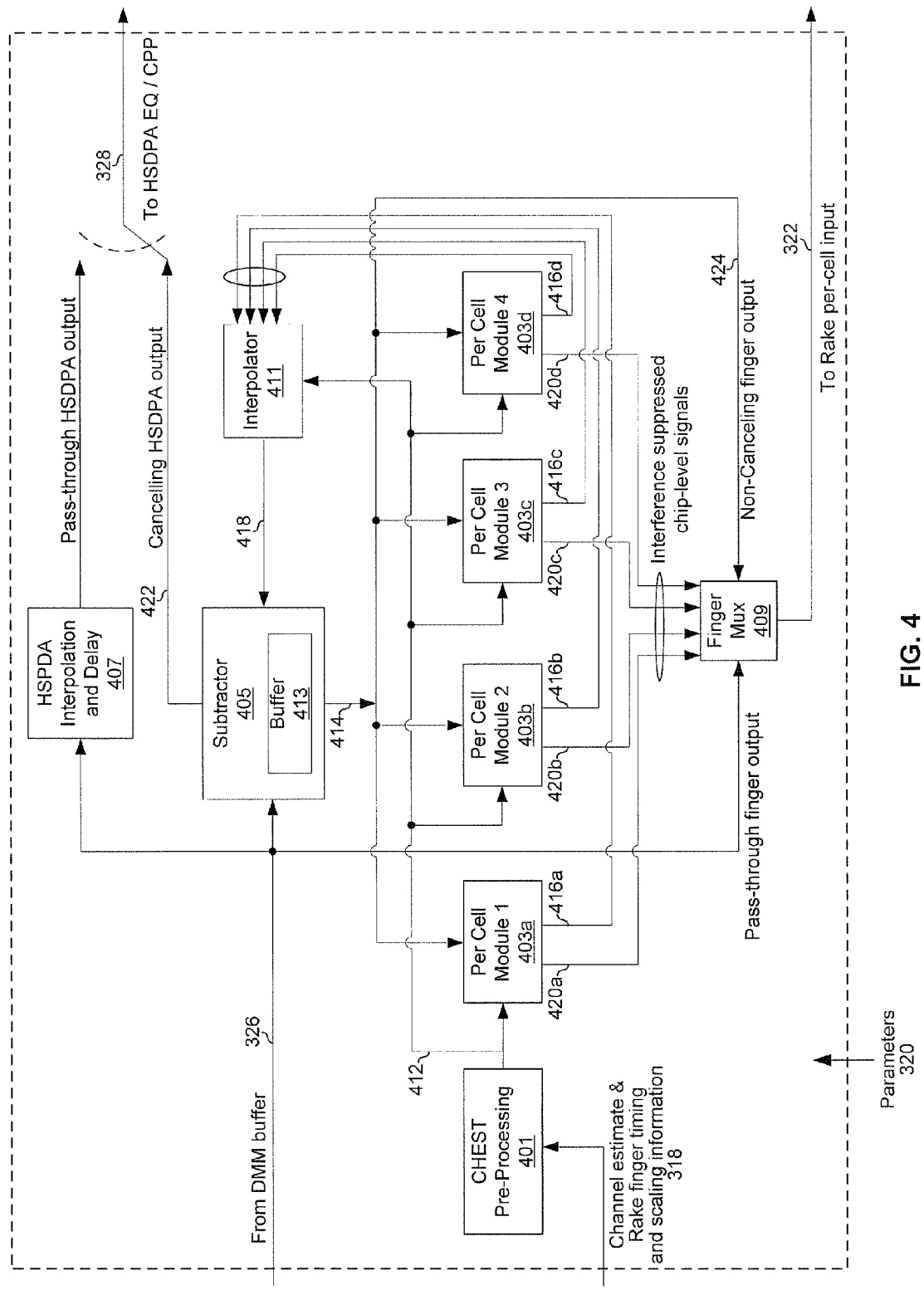
FIG. 4 is a block diagram illustrating an exemplary interference cancellation module, in accordance with an embodiment of the invention.

FIG. 4 is a block diagram illustrating an exemplary interference cancellation module, in accordance with an embodiment of the invention. Referring to FIG. 4, there is shown an interference cancellation module 302 comprising a channel estimate (CHEST) pre-processing block 401, interference cancellation per-cell modules 403A, 403B, 403C, 403D, an interference cancellation subtractor 405, an HSDPA interpolation and delay block 407, a finger MUX 409, and an interpolator 411.

The CHEST pre-processing block 401 may comprise suitable circuitry, logic, interfaces, and/or code that may be operable to normalize channel estimate information input as signal 412 to the Per-Cell Modules 403 and the interpolator 411. The normalization may be based on channel estimate and rake finger timing and scaling information 318 received from the rake fingers 312, 314, and 316.

The subtractor 405 may comprise suitable circuitry, logic, interfaces, and/or code that may be operable to subtract estimated signals from received signals as part of the generation of an interference suppressed version of the received signals. The subtractor 405 may be operable to receive, as inputs, signals generated by the Per-Cell modules 403A-403D that may be interpolated by the interpolator 411, as well as 256-chip bursts of the delayed received signal 326 from the delay buffer 304.

The HSDPA interpolation and delay module 407 may comprise suitable circuitry, logic, interfaces, and/or code that may be operable to provide a bypass path for signals received from the delay buffer 304. The HSDPA interpolation and delay module 407 may, for example, interpolate cx2 samples to cx16 samples, and may introduce a delay that equals the delay of the interference cancellation module 302 when operating in interference cancellation mode.

The finger MUX 409 may comprise suitable circuitry, logic, interfaces, and/or code that may be operable to select from the plurality of signals 420 generated by the Per-Cell modules 403A-403D, the input signal from the delay buffer 304, or a non-cancelling finger input 424. In this manner, the finger MUX 409 may enable a pass-through mode, an interference cancelling mode, or a non-cancelling mode.

The interpolator 411 may comprise suitable circuitry, logic, interfaces, and/or code that may be operable to interpolate a received signal, such as a cx1 signal and output a cx2 signal, for example.

The Per-Cell modules 403A-403D may each comprise suitable circuitry, logic, interfaces, and/or code that may be operable to generate an estimate of a multi-user (e.g., WCDMA) chip-level signal transmitted by an associated BTS. The Per-Cell modules 403A-403D may process bursts—256-chip bursts, for example—of a multipath, multi-user signal. In this regard, a received signal 326 processed by the modules 403A-403D may comprise information received via one or more RF paths via one or more receive antennas from one or more transmit antennas of one or more BTSs, each BTS having up to J users. In this regard, each of the modules 403A-403D may be allocated for processing signals from a particular transmit antenna of a particular BTS and a signal from a particular transmit antenna may be received over one or more paths via one or more receive antennas. Accordingly, each of the modules 403A-403D may be operable to provide compensation for multipath effects, suppress interference from BTSs other than an associated or "serving" BTS, and suppress interference between users of the associated or "serving" BTS.

In an exemplary embodiment of the invention, the four Per-Cell modules 403A-403D may be operable to cancel and/or suppress interference from four non-diversity transmit (Tx) cells, two Tx diversity cells, one Tx diversity cell and two non-Tx diversity cells, one Tx diversity cell with two scrambling codes per antenna, and/or one non Tx-diversity cell that has four scrambling codes. However, the invention need not be so limited, and may support any number of cells depending on the number of Per-Cell modules integrated in the interference cancellation module.

In operation the delayed received signal 326 may be conveyed to the subtractor 405 in bursts, and the bursts may be stored in the residue buffer 413 which may be operable to store, for example, 3×256 chips worth of samples. The residue buffer may also generate polyphase samples for each of the per-cell modules 403A-403D. In an exemplary embodiment of the invention, the signal 326 may be conveyed in 256-chip bursts, with a time between bursts equal to a 256-chip time period. The signal 318 is another input to the interference cancellation module 302 and may comprise the channel estimation, time tracking, and/or scrambling code information from the Rake fingers.

In HSDPA pass-through mode, the signal 326 may be routed via the HSDPA interpolation and delay module 407, which may, for example, interpolate Cx2 samples to Cx16 samples and introduce a fixed delay that equals the interference cancellation module 320 delay as if operating in HSDPA canceling mode. For pass-through mode, the signal 326 may go directly to the finger MUX 409, where it may be interpolated and delayed before being sent to one or more associated rake fingers such as 312, 314, and 316. The delay may equal the interference cancellation module 320 delay as if the block were operating in canceling mode.

In instances where the interference cancellation module 320 is engaged, where at least one rake finger is in the "canceling mode", or HSDPA is in the canceling mode, the signal 236 may go into the subtractor 405. The interpolator 411 may interpolate the estimated signals 416a-416d output by the per-cell modules 403 and sequentially output the interpolated versions of the estimated signals 416a-416d to the subtractor 405 as signal 418. The subtractor 405 may subtract the interpolated estimated signals 418 from the input signal 326 stored in the buffer 413. The residual signal stored in the residue buffer 413 may be utilized for further signal estimation in the per-cell modules 403A-403D. In this regard, iterative processing may be utilized for interference suppression. The subtractor 405 may also generate the "canceling mode" HSDPA output data stream 422 and the "non-canceling mode" rake finger output data stream 424.

Each of the per-cell modules 403A-403D may be operable to estimate a received signal for each of the J OVSF codes associated with a particular BTS and/or particular BTS scrambling code. The estimated symbol-level signals for the J codes may be summed up and reconstructed with the channel estimation to convert them back to chip-level signals 416. The chip-level estimated signals 416 may be fed back into the subtractor 405. Each of the per-cell modules 403A-403D may receive scrambling code information, associated finger channel estimation and time tracking information from the CHEST pre-processing module 401 and the output 414 from the subtractor 405. Each of the per-cell modules 403A-403D may be associated with one transmit antenna from a cell. In the case of no Tx diversity, each cell may be associated with one per-cell module; in the case of Tx diversity, the PRISM per-cell module is associated with one transmit antenna out of the two transit antenna of a cell.

Figure 5A:
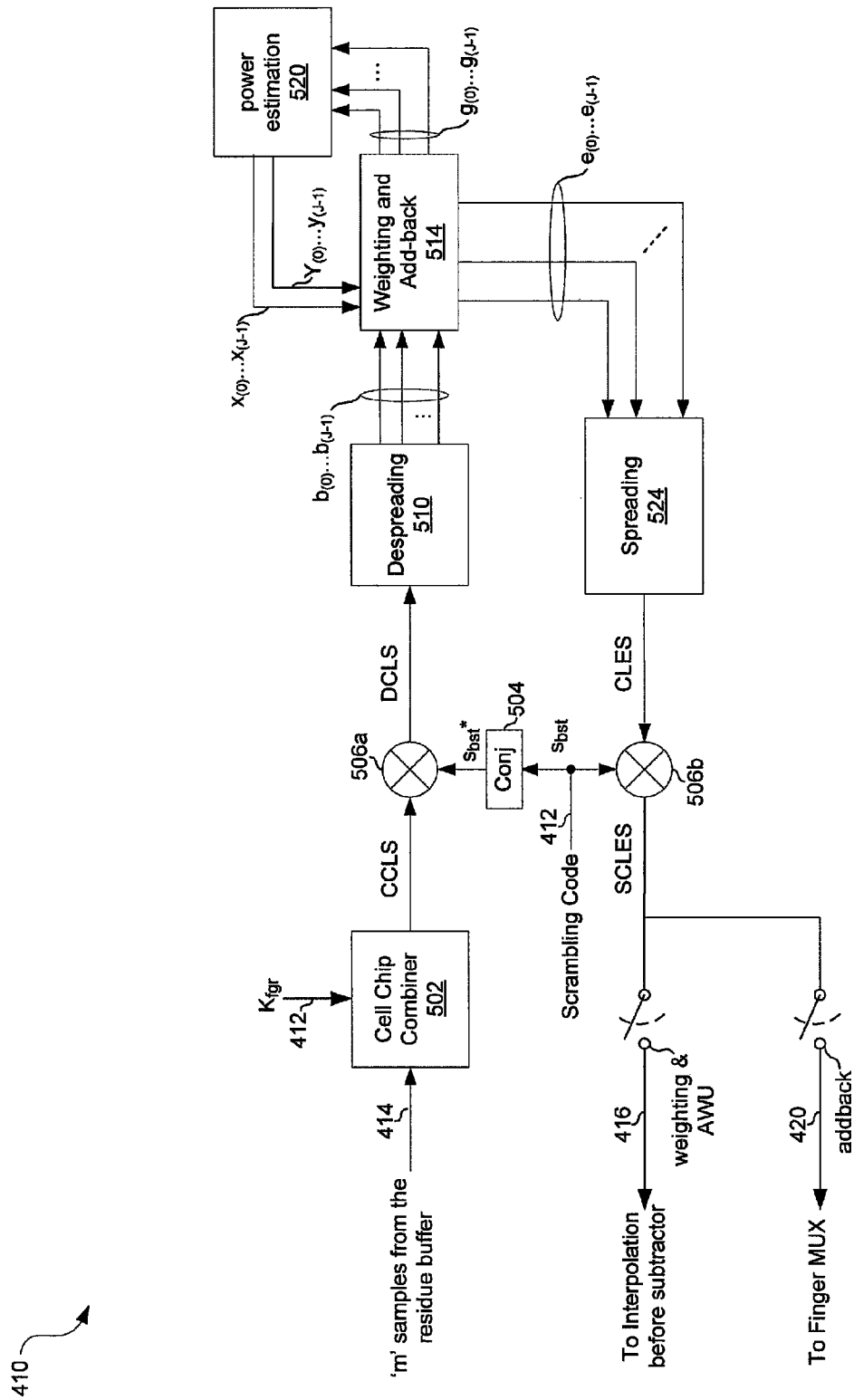
FIG. 5A is a diagram illustrating an exemplary per-cell module, in accordance with an embodiment of the invention.

FIG. 5A is a diagram illustrating an exemplary per-cell module, in accordance with an embodiment of the invention. Referring to FIG. 5A, the exemplary per-cell module 410x, which may be similar to or the same as the per-cell modules 410a-410d described with respect to FIG. 4, comprises a cell chip combiner 502, a conjugation module 504, multipliers 506a-506b, a despreading module 510, a weighting and addback module 514, a power estimation module 520, and a spreading module 520. In various embodiments of the invention, the per-cell module 410 may be associated with a particular BTS and, in instances of transmit diversity, a particular t antenna.

The cell chip combiner 502 may comprise suitable logic, circuitry, interfaces, and/or code that may be operable to receive a chip-level signal 414 in bursts from the residue buffer 413 and generate a combined chip-level signal (CCLS). In this regard, the signal 414 may comprise information received via multiple paths and the cell chip combiner 502 may combine information received via multiple paths utilizing, for example, maximal ratio combining. Prior to a weighting iteration, the signal 414 may comprise a delayed version of the received signal 324. After a weighting iteration the signal 414 may comprise a first residual signal. After a weighting, addback, and un-addback iteration, the signal 414 may comprise a second residual signal.

The conjugation module 504 may comprise suitable circuitry, logic, interfaces, and/or code that may be operable to conjugate the scrambling code s associated with a base station to generate the descrambling code s*.

The multipliers 506a and 506b may comprise suitable logic, circuitry, interfaces, and/or code that may be operable to multiply digital signals.

The despreading module 510 may comprise suitable logic, circuitry, interfaces, and/or code that may be operable to separate a received signal into a plurality of user signals $b_{(0)} \ldots b_{(J-1)}$ determined by a plurality, J, of OVSF codes. In an exemplary embodiment of the invention, J may be equal to 256 and thus the despreading module 510 may be operable to separate a multi-user chip-level signal into 256 user signals $b_{(0)} \ldots b_{(255)}$. In an exemplary embodiment of the invention, the despreading module 510 may perform a fast Hadamard transform (FHT).

The weighting and addback module 514 may comprise suitable logic, circuitry, interfaces, and/or code that may be operable to generate estimated signals $e_{(0)} \ldots e_{(J-1)}$ corresponding to each of the potential J user signals transmitted by a BTS. The estimate signals $e_{(0)} \ldots e_{(J-1)}$ may be incrementally updated over one or more processing iterations. The weighting and addback module 514 may perform weighting functions, addback functions, and un-addback functions.

The power estimation module 520 may comprise suitable circuitry, logic, interfaces, and/or code that may be operable to estimate power and noise of up to J user signals. In this regard, the power estimation module 520 may be operable to generate signal power estimates $x_{(0)} \ldots x_{(J-1)}$ and noise power estimates $y_{(0)} \ldots y_{(J-1)}$ for the estimated signals $g_{(0)} \ldots g_{(J-1)}$ from the weighting and addback module 514.

The spreading module 524 may comprise suitable circuitry, logic, interfaces, and/or code that may be operable to perform the inverse functions of the despreading module 510. In this regard, the spreading module 524 may spread J user signals onto a single multi-user signal, utilizing, J OVSF codes. In an exemplary embodiment of the invention, the spreading module 524 may be operable to perform an inverse fast Hadamard transform (IFHT) on the estimate signals $e_{(0)} \ldots e_{(J-1)}$.

The per-cell module 410x may operate on bursts of 'm' samples which may correspond to 'i' chips of the received chip-level signal 324 which, in turn, may correspond to one symbol of the symbol-level user signals $b_{(0)} \ldots b_{(J-1)}$. In an exemplary embodiment of the invention, 'i' equals 256, and 'm' equals 8*i samples, where the signal 326 is up-sampled by 8 before being stored in the residue buffer 413. In a receive diversity system, the residue buffer 413 may store signals from different receiving antennas separately, and the 'm' symbols read out from the residue buffer 413 may correspond to a particular receiving antenna.

In operation, each burst of 'm' samples stored in the residue buffer 413 may be processed N times, with the first iteration being a weighting iteration; the next N–2 iterations being addback, weighting, and un-addback (AWU) iterations; and the final iteration being an addback iteration.

Figure 5B:
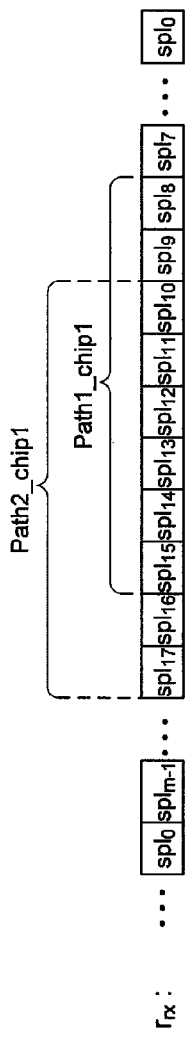
FIGS. 5B-5E illustrate exemplary signals, in accordance with an embodiment of the invention.
Figure 5C:

The weighting iteration may begin with 'm' samples, corresponding to i chips, being conveyed from the residue buffer 413 to the cell chip combiner 502. For the weighting iteration, the samples stored in the residue buffer 413 may comprise samples of the received multi-user, multipath signal 324. Accordingly, for each path associated with a rake finger 312, 314, or 316, the cell chip combiner 502 may combine the various paths to generate i chips of a combined chip-level signal (CCLS). For example, FIG. 5B depicts m samples of an exemplary received signal 324, where the signal 324 is received via two paths and the paths are offset by two sample times. FIG. 5C depicts the chips received via the first path aligned and combined with the chips received via the second path, to generate a 256-chip burst of the signal (CCLS).

Figure 5D:
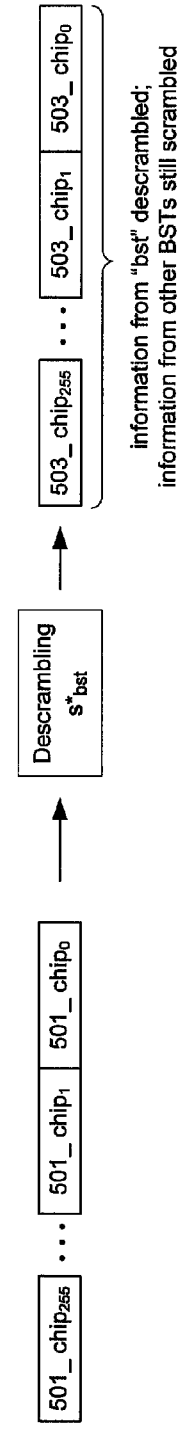

Referring back to FIG. 5A, an i-chip burst of the CCLS may be conveyed to the multiplier 506a where the i-chip burst may be descrambled to generate an i-chip burst of a descrambled chip-level (DCLS). In this regard, the bursts of the CCLS may be multiplied by a descrambling code s* that is based on the PN sequence corresponding to the particular BTS associated with the per-cell module 410x. Accordingly, information in the DCLS from other BTSs may remain scrambled and appear as white noise. For example, FIG. 5D depicts descrambling of a 256-chip burst of the CCLS, utilizing descrambling code $s_{bts}^*$ associated with a base station "bts" to generate a 256-chip of the DCLS.

Figure 5E:
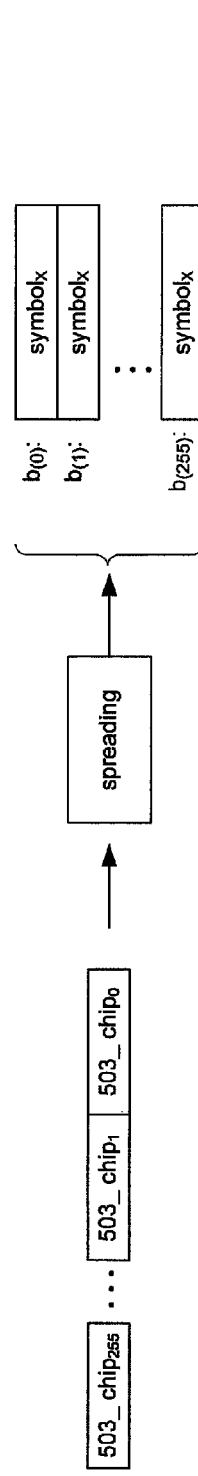

Referring back to FIG. 5A, the bursts of the DCLS may be conveyed to the despreading module 510 which may generate a corresponding symbol of each of the symbol-level baseband user signals $b_{(0)} \ldots b_{(J-1)}$. In this regard, the signals $b_{(0)} \ldots b_{(J-1)}$ may be generated by despreading bursts of the DCLS utilizing the J OVSF codes corresponding to the J potential users of the BTS. In an exemplary embodiment of the invention, the despreading of the bursts of the DCLS by the J OVSF codes may comprise a Walsh transform operation. For example, FIG. 5E depicts 256 chips of the DCLS being despread to generate 256 user signals $b_{(0)} \ldots b_{(255)}$.

Referring back to FIG. 5A, the user signals $b_{(0)} \ldots b_{(J-1)}$ may be conveyed to the weighting and add-back module 514 which may generate symbol-level baseband estimate signals $e_{(0)} \ldots e_{(J-1)}$. The estimate signals $e_{(0)} \ldots e_{(J-1)}$ generated during the weighting iteration are a first estimate of the user signals transmitted by the associated BTS.

The estimate signals $e_{(0)} \ldots e_{(J-1)}$ may be processed by the spreading module 524 utilizing the same OVSF codes as the despreading module 510, to generate an i-chip burst of a chip-level estimated signal (CLES). The burst of the CLES may then be multiplied, via the multiplier 506b, by the scrambling code $s_{bts}$ to generate a burst of a scrambled chip-level estimated signal (SCLES). In this regard, $s_{bts}$ may be the conjugate of $s_{bts}^*$ utilized by the multiplier 506a.

The burst of the SCLES may be interpolated to m samples, and then the m samples of signal SCLES may be subtracted from the m samples stored in the residue buffer 413 to generate m samples of a residual signal.

An addback, weighting, and un-addback (AWU) iteration may begin with the 'm' samples of a residual signal being conveyed from the residue buffer 413 to the cell chip combiner 502. For the AWU iteration, the m samples of the residual signal may correspond to a result of m samples of SCLES from a previous weighting iteration or AWU iteration being subtracted from the corresponding m samples of the original received signal 324. The cell chip combiner 502 may generate CCLS', the multiplier 506a may output DCLS', and the despreading module 510 may generate user signals $b_{(0)}' \ldots b_{(J-1)}'$, where the "prime" notation indicates that the burst has previously been processed during a weighting iteration.

The weighting and add-back module 514 may be operable to generate second estimate signals $e_{(0)}^* \ldots e_{(J-1)}^*$ by scaling the user signals $b_{(0)}' \ldots b_{(J-1)}'$, and may be operable to generate incremental symbol-level baseband estimate signals $e_{(0)}' \ldots e_{(J-1)}'$, which represent an estimate of user signal information remaining in the residual signal generated during the weighting iteration and any preceding AWU iterations.

The incremental estimate signals $e_{(0)}' \ldots e_{(J-1)}'$ may be processed by the spreading module 524 utilizing the same OVSF codes as the despreading module 510, to generate a burst of a CLES'. The CLES' may then be multiplied, via the multiplier 506b, by the scrambling code $s_{bts}$ to generate a burst of a SCLES'. SCLES' may be interpolated to m samples, and then the m samples of SCLES' may be subtracted from the corresponding m samples stored in the residue buffer 413 to generate a residual signal.

The addback iteration may begin with 'm' samples of a residual signal being conveyed from the residue buffer 413 to the cell chip combiner 502. For the addback iteration, the m samples of the residual signal from the residue buffer 413 may correspond to a result of m samples of SCLES from a previous weighting iteration and SCLES' from at least one previous AWU iteration being subtracted from the corresponding m samples of the received signal 324.

During an addback iteration, the cell chip combiner 502 may generate CCLS", the multiplier 506a may output DCLS", and the despreading module 510 may generate user signals $b_{(0)}" \ldots b_{(J-1)}"$, where the "double prime" notation indicates that the burst been processed and/or modified during a previous weighting iteration and one or more previous AWU iterations.

The user signals $b_{(0)}"$ ... $b_{(J-1)}"$ may be input to the weighting and add-back module 514, which may generate symbol-level baseband estimate signals $e_{(0)}"$ ... $e_{(J-1)}"$. The estimate signals $e_{(0)}"$ ... $e_{(J-1)}"$ represent an final estimate of user signals as transmitted by the associated BTS.

The estimate signals $e_{(0)}"$ ... $e_{(J-1)}"$ may be processed by the spreading module 524 utilizing the same OVSF codes as the despreading module 510, to generate a burst of a CLES". The CLES" may then be multiplied, via the multiplier 506b, by the scrambling code $s_{bts}$ to generate a SCLES". The SCLES" may be output to the finger mux 409.

Figure 6:
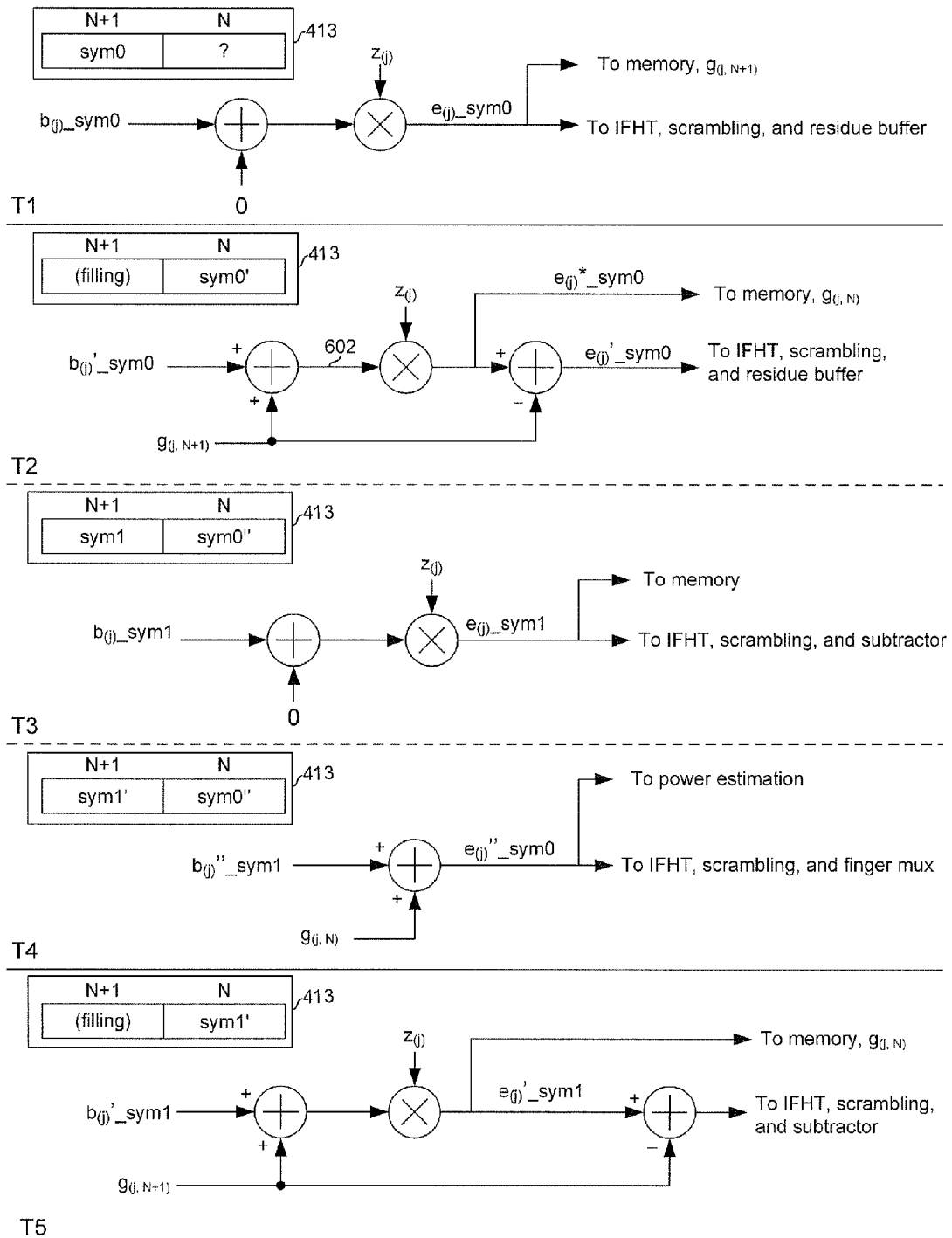
FIG. 6 is a diagram illustrating exemplary operation of a weighting and addback module, in accordance with an embodiment of the invention.

FIG. 6 is a diagram illustrating exemplary operation of a weighting and addback module, in accordance with an embodiment of the invention. Referring to FIG. 6, there is shown processing of two symbols in the weighting and addback module 514.

During time interval T1, which is part of a $1^{st}$ 256-chip time period, symbol 0 of a received signal 324 ("sym0") may be conveyed from the delay buffer 304 (FIG. 3) to the residue buffer 413 and may be stored at symbol index N+1 of the residue buffer 413. Sym0 may undergo multi-path combining, descrambling, and despreading to generate symbol 0 of user signals $b_{(0)}$ ... $b_{(J-1)}$, referenced as $b_{(0)}$_sym0 ... $b_{(J-1)}$_sym0. Next, $b_{(0)}$_sym0 ... $b_{(J-1)}$_sym0 may arrive at the weighting and addback module 514 and may be scaled by the weighting factors $z_{(j)}$ ... $z_{(J-1)}$, respectively, to generate $e_{(0)}$_sym0 ... $e_{(J-1)}$_sym0. The values of $e_{(0)}$_sym0 ... $e_{(J-1)}$_sym0 may be stored in, for example, a look-up table indexed by one or more of: the receive antenna via which the signal 324 was received, the base station associated with the per-cell module, user number, j, and the residue buffer index N+1. For simplicity of illustration, the base station and receive antenna indices are dropped and the stored values are referenced as $g_{(0, N+1)}$ ... $g_{(J-1, N+1)}$. Also in time the interval T1, $e_{(0)}$_sym0 ... $e_{(J-1)}$_sym0 may be re-spread onto a multi-user signal, re-scrambled based on the scrambling code of the associated BTS, and then subtracted from sym0 in the residue buffer 413 to generate the sym0'—symbol 0 of a residual signal resulting from a weighting iteration.

At the end of time interval T1 and/or at the beginning of time interval T2, the residue buffer index of sym0' may become N. Also, index N+1 of the residue buffer 413 may begin filling with sym1. The residue buffer may complete filling with sym1 prior to the end of time interval T2.

During time interval T2, which is part of a $2^{nd}$ 256-chip time period, the symbol sym0' may undergo multi-path combining, descrambling, and despreading, to generate $b_{(0)}'$_sym0 ... $b_{J-1}'$_sym0. In the weighting and addback module 514, the stored values $g_{(0, N+1)}$ ... $g_{(J-1, N+1)}$ from time interval T1 are added, respectively, to $b_{(0)}'$_sym0 ... $b_{(J-1)}'$_sym0. The result of the addition may then be scaled by $z_{(j)}$ and the result of the scaling may be stored to memory. For illustration, the stored values are referenced as $g_{(0, N)}$ ... $g_{(J-1, N)}$. The scaling factors, $z_{(0)}$ ... $z_{(J-1)}$, may have been updated since time interval T1. Also during the time interval T2, $g_{(0, N)}$ ... $g_{(J-1, N)}$ may be subtracted from $e_{(0)}$_sym0 ... $e_{(J-1)}$_sym0 to generate $e_{(0)}'$_sym0 ... $e_{(J-1)}'$_sym0. Finally, $e_{(0)}'$_sym0 ... $e_{(J-1)}'$_sym0 may be re-spread to generate a multi-user signal, re-scrambled based on the scrambling code of the associated BTS, and then subtracted from the sym0' in the residue buffer 413 to generate the residual sym0"—symbol 0 of a residual signal resulting from a weighting iteration and one or more AWU iterations. Ideally, sym0" would comprise only thermal noise.

During time interval T3, which is part of the $2^{nd}$ 256-chip time period, the symbol sym1 may be processed in the same manner that sym0 was processed during time interval t1. In this regard, after going through multi-path combining, descrambling, and despreading, $b_{(0)}$_sym1 ... $b_{(J-1)}$_sym1 may arrive at the weighting and addback module 514 and may be scaled by the weighting factors $z_{(j)}$ ... $z_{(J-1)}$, respectively, to generate $e_{(0)}$_sym1 ... $e_{(J-1)}$_sym1. The values of $e_{(0)}$_sym1 ... $e_{(J-1)}$_sym1 may be stored in memory indexed by one or more of: the receive antenna via which the signal 324 was received, the base station associated with the per-cell module, user number, j, and the residue buffer index N+1. For simplicity of illustration, the base station and receive antenna indices are dropped and the stored values are referenced as $g_{(0, N+1)}$ ... $g_{(J-1, N+1)}$. Also in the time interval T3, $e_{(0)}$_sym1 ... $e_{(J-1)}$_sym1 may be re-spread onto a multi-user signal, re-scrambled based on the base station scrambling code, and then subtracted from sym0 in the residue buffer 413 to generate the residual sym1'—symbol 1 of a residual signal resulting from a weighting iteration.

During time interval T4, which is part of the $2^{nd}$ 256-chip time period, sym0"—generated during the time interval T2—may undergo multi-path combining, descrambling, and despreading to generate $b_{(0)}"$_sym0 ... $b_{(J-1)}"$_sym0. In the weighting and addback module 514, $e_{(0)}'$_sym0 ... $e_{(J-1)}'$_sym0 may be added, respectively, to $b_{(0)}"$_sym0 ... $b_{(J-1)}"$_sym0 to generate $e_{(0)}"$_sym0 ... $e_{(J-1)}"$_sym0. The signals $e_{(0)}"$_sym0 ... $e_{(J-1)}"$_sym0 may be stored to memory and/or utilized by the power estimation module 520. For simplicity of illustration, the stored values are referenced as $g_{(0, N)}$ ... $g_{(J-1, N)}$. Finally during the time interval T4, $e_{(0)}"$_sym0 ... $e_{(J-1)}"$_sym0 may be re-spread to generate a multi-user signal, re-scrambled based on the base station scrambling code, and then conveyed to the finger mux 409. Ideally, $e_{(0)}"$_sym0 ... $e_{(J-1)}"$ would be an exact replica of the user signals transmitted by the base station.

At the end of the time interval T1 and/or at the beginning of the time interval T2, the residue buffer index of sym1' may become N, and index N+1 of the residue buffer 413 may begin filling with sym2. The residue buffer may complete filling with sym2 prior to the end of time interval T5. During time interval T5, sym1' may be processed in the same manner that sym0' was processed during the time interval T2. In this regard, subsequent to the time interval T4, the operations of the time intervals T2 through T4 may be repeated for processing of the symbol sym2, the symbol sym3, and so on.

Various aspects of a method and system for processing signals utilizing a programmable interference suppression module are provided. In an exemplary embodiment of the invention, a received signal 324 may be iteratively processed to generate an interference suppressed representation of the received signal. The iterative processing may comprise a weighting iteration, one or more addback weighting and unaddback iterations, and an addback iteration.

The weighting iteration may comprise generating one or more first estimate signals $e_{(0)}$ ... $e_{(J-1)}$ (FIG. 5A) that estimate user signals present in the received signal 324, and generating a first residual signal 414 (FIG. 4) based on information contained in the received signal 324, or delayed version thereof 326, and the one or more first estimated signals $e_{(0)}$ ... $e_{(J-1)}$. The one or more first estimate signals $e_{(0)}$ ... $e_{(J-1)}$ may be generated by descrambling and despreading the received signal 324 or 326 to generate a plurality of user signals $b_{(0)}$ ... $b_{(J-1)}$ having unsuppressed interference, and scaling, respectively, the user signals $b_{(0)}$ ... $b_{(J-1)}$ by a corresponding one or more scaling factors $z_{(0)}$ ... $z_{(J-1)}$ (FIG. 6). The first residual signal 414 may be generated by spreading and scrambling the one or more first estimate signals $e_{(0)} \ldots e_{(J-1)}$ to generate a first chip-level estimate signal SCLES (FIG. 5A), and subtracting the first chip-level estimate signal SCLES from the received signal, stored in the residue buffer 413, to generate the first residual signal 414.

The one or more addback, weighting, and un-addback iterations may comprise generating one or more first intermediate signals 602 (FIG. 6) based on information contained in the first estimate signals $e_{(0)} \ldots e_{(J-1)}$ and information contained in the residual signal 414, generating one or more second estimate signals $e_{(0)}^* \ldots e_{(J-1)}^*$ that estimate user signals present in the one or more first intermediate signals 602, generating one or more incremental estimate signals $e_{(0)}' \ldots e_{(J-1)}'$ based on the one or more first estimate signals $e_{(0)} \ldots e_{(J-1)}$ and the one or more second estimate signals $e_{(0)}^* \ldots e_{(J-1)}^*$, and generating a second residual signal 414 based on information contained in the one or more incremental estimate signals $e_{(0)}' \ldots e_{(J-1)}'$ and the first residual signal 414. The one or more first intermediate signals 602 may be generated by descrambling and despreading the first residual signal 414 to generate one or more first residual user signals $b_{(0)}' \ldots b_{(J-1)}'$, and adding, respectively, the one or more first residual user signals $b_{(0)}' \ldots b_{(J-1)}'$ to the one or more first estimate signals $e_{(0)} \ldots e_{(J-1)}$. The one or more second estimate signals $e_{(0)}^* \ldots e_{(J-1)}^*$ may be generated by scaling the one or more intermediate signals 602, respectively, by a corresponding one or more scaling factors $z_{(0)} \ldots z_{(J-1)}$. The one or more incremental estimate signals $e_{(0)}' \ldots e_{(J-1)}'$ may be generated by subtracting, respectively, the one or more first estimate signals $e_{(0)} \ldots e_{(J-1)}$ from the one or more second estimate signals $e_{(0)}^* \ldots e_{(J-1)}^*$. The second residual signal 414 may be generated by spreading and scrambling the one or more incremental estimate signals $e_{(0)}' \ldots e_{(J-1)}'$ to generate an incremental chip-level estimate signal DCLES', and subtracting the incremental chip-level estimate signal DCLES' from the first residual signal 414.

The addback iteration may comprise generating an interference suppressed representation of the received signal 324 based on at least the one or more second estimate signals $e_{(0)}^* \ldots e_{(J-1)}^*$ and the second residual signal 412. The interference suppressed representation of the received signal may be generated by performing at least a descrambling and despreading of the second residual signal 412 to generate one or more second residual user signals $b_{(0)}'' \ldots b_{(J-1)}''$, and adding, respectively, the one or more second residual user signals $b_{(0)}'' \ldots b_{(J-1)}''$ to the one or more second estimate signals $e_{(0)}^* \ldots e_{(J-1)}^*$.

Another embodiment of the invention may provide a machine and/or computer readable medium, having stored thereon, a computer program having at least one code section executable by a machine and/or computer, thereby causing the machine and/or computer to perform the steps as described herein for interference suppression in WCDMA.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing a received signal to generate an interference suppressed representation of said received signal, the method comprising:
   generating, in a circuit and/or a processor, one or more first estimate signals that estimate user signals present in said received signal;
   generating, in the circuit and/or the processor, a first residual signal based on information contained in said received signal and said one or more first estimate signals;
   generating, in the circuit and/or the processor, one or more first intermediate signals based on information contained in said one or more first estimate signals and said first residual signal;
   generating, in the circuit and/or the processor, one or more second estimate signals that estimate user signals present in said one or more first intermediate signals;
   generating, in the circuit and/or the processor, one or more incremental estimate signals by subtracting said one or more first estimate signals from said one or more second estimate signals;
   generating, in the circuit and/or the processor, a second residual signal based on information contained in said one or more incremental estimate signals and said first residual signal; and
   generating said interference suppressed representation of said received signal based on said one or more second estimate signals and said second residual signal.

2. The method according to claim 1, wherein said generating said one or more first estimate signals comprises:
   descrambling and despreading said received signal to generate a plurality of user signals having unsuppressed interference; and
   scaling, respectively, said user signals having unsuppressed interference by a corresponding one or more scaling factors to generate said one or more first estimate signals.

3. The method according to claim 1, wherein said generating said residual signal comprises:
   spreading and scrambling said one or more first estimate signals to generate a first chip-level estimate signal; and
   subtracting said first chip-level estimate signal from said received signal to generate said first residual signal.

4. The method according to claim 1, wherein said generating said one or more first intermediate signals comprises:
descrambling and despreading said first residual signal to generate one or more first residual user signals; and
adding, respectively, said one or more first residual user signals to said one or more first estimate signals to generate said one or more first intermediate signals.

5. The method according to claim 1, wherein said generating said one or more second estimates signals comprises scaling, respectively, said one or more intermediate signals by a corresponding one or more scaling factors.

6. The method according to claim 1, wherein said generating said second residual signal comprises:
spreading and scrambling said one or more incremental estimate signals to generate an incremental chip-level estimate signal; and
subtracting said incremental chip-level estimate signal from said first residual signal to generate said second residual signal.

7. The method according to claim 1 wherein said generating said interference suppressed representation of said received signal comprises:
descrambling and despreading said second residual signal to generate one or more second residual user signals; and
adding, respectively, said one or more second residual user signals to said one or more second estimate signals.

8. A wireless communication device configured to generate an interference suppressed representation of a received signal, the wireless communication device comprising:
an antenna configured to receive said received signal; and
a circuit and/or a processor configured to:
generate one or more first estimate signals that estimate user signals present in said received signal;
generate a first residual signal based on information contained in said received signal and said one or more first estimate signals;
generate one or more first intermediate signals based on information contained in said one or more first estimate signals and said first residual signal;
generate one or more second estimate signals that estimate user signals present in said one or more first intermediate signals;
generate one or more incremental estimate signals by subtracting said one or more first estimate signals from said one or more second estimate signals;
generate a second residual signal based on information contained in said one or more incremental estimate signals and said first residual signal; and
generate said interference suppressed representation of said received signal based on said one or more second estimate signals and said second residual signal.

9. The wireless communication device according to claim 8, wherein, to generate said one or more first estimate signals, said circuit and/or processor is configured to:
descramble and despread said received signal to generate a plurality of user signals having unsuppressed interference; and
scale, respectively, said user signals having unsuppressed interference by a corresponding one or more scaling factors to generate said one or more first estimate signals.

10. The wireless communication device according to claim 8, wherein, generate said first residual signal, said circuit and/or processor is configured to:
spread and scramble said one or more first estimate signals to generate a first chip-level estimate signal; and
subtract said first chip-level estimate signal from said received signal to generate said first residual signal.

11. The wireless communication device according to claim 8, wherein, to generate said one or more first intermediate signals, said circuit and/or processor is configured to:
descramble and despread said first residual signal to generate one or more first residual user signals; and
add, respectively, said one or more first residual user signals to said one or more first estimate signals to generate said one or more first intermediate signals.

12. The wireless communication device according to claim 8, wherein said circuit and/or processor is configured to scale, respectively, said one or more intermediate signals by a corresponding one or more scaling factors to generate said one or more second estimate signals.

13. The wireless communication device according to claim 8, wherein, to generate said second residual signal, said circuit and/or processor is configured to:
spread and scramble said one or more incremental estimate signals to generate an incremental chip-level estimate signal; and
subtract said incremental chip-level estimate signal from said first residual signal to generate said second residual signal.

14. The wireless communication device according to claim 8, wherein to generate said interference suppressed representation of said received signal, said circuit and/or processor is configured to:
descramble and despread said second residual signal to generate one or more second residual user signals; and
add, respectively, said one or more second residual user signals to said one or more second estimate signals.

* * * * *

UNITED STATES PATENT AND TRADEMARK OFFICE
CERTIFICATE OF CORRECTION

| | | |
|---|---|---|
| PATENT NO. | : 8,369,384 B2 | Page 1 of 1 |
| APPLICATION NO. | : 12/612272 | |
| DATED | : February 5, 2013 | |
| INVENTOR(S) | : Hahm et al. | |

It is certified that error appears in the above-identified patent and that said Letters Patent is hereby corrected as shown below:

In the Claims:

Column 20

Line 63, please replace "said residual" with --said first residual--.

Column 21

Line 9, please replace "estimates" with --estimate--.

Column 21

Line 20, please replace "claim 1" with --claim 1,--.

Signed and Sealed this
Thirtieth Day of July, 2013

Teresa Stanek Rea
*Acting Director of the United States Patent and Trademark Office*